United States Patent [19]
Fredrickson

[11] Patent Number: 5,238,068
[45] Date of Patent: Aug. 24, 1993

[54] METHODS OF FRACTURE ACIDIZING SUBTERRANEAN FORMATIONS

[75] Inventor: Sherman E. Fredrickson, Duncan, Okla.

[73] Assignee: Halliburton Company, Duncan, Okla.

[21] Appl. No.: 907,095

[22] Filed: Jul. 1, 1992

[51] Int. Cl.⁵ .................. E21B 43/26; E21B 43/27
[52] U.S. Cl. ................................... 166/307; 166/308
[58] Field of Search ............... 166/307, 308, 280, 292, 166/282

[56] References Cited

U.S. PATENT DOCUMENTS

| | | | |
|---|---|---|---|
| 3,768,564 | 10/1973 | Knox et al. | 166/307 |
| 3,842,911 | 10/1974 | Knox et al. | 166/307 |
| 4,245,702 | 1/1981 | Haafkens et al. | 166/307 |
| 4,249,609 | 2/1981 | Haafkens et al. | 166/307 X |
| 4,739,832 | 4/1988 | Jennings, Jr. et al. | 166/307 X |
| 4,807,703 | 2/1989 | Jennings, Jr. | 166/307 |

Primary Examiner—Stephen J. Novosad

[57] ABSTRACT

Improved methods of fracture-acidizing producing zones in subterranean formations are provided. The methods basically comprise creating one or more fractures in the zone, causing the fractures to close and injecting acid into and through the closed fractures so that flow channels are formed therein. The fractures are then extended in the zone, caused to close and acid is injected through the previously formed flow channels and through the extended portions of the fractures so that flow channels are formed in the extended portions. The steps of extending the fractures, causing the fractures to close and injecting acid are repeated until fractures having flow channels formed therein are extended desired distances in the zone.

20 Claims, 2 Drawing Sheets

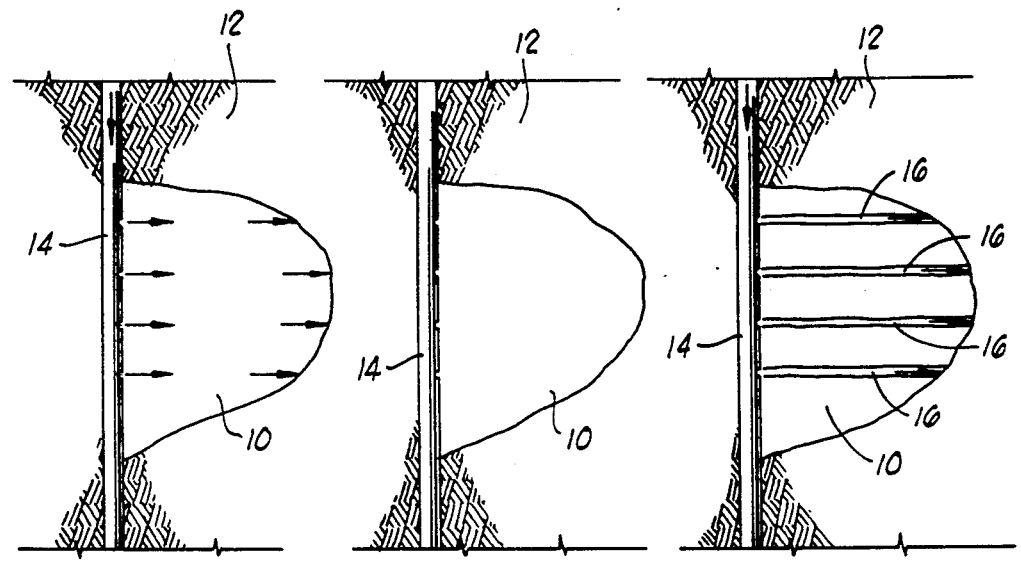
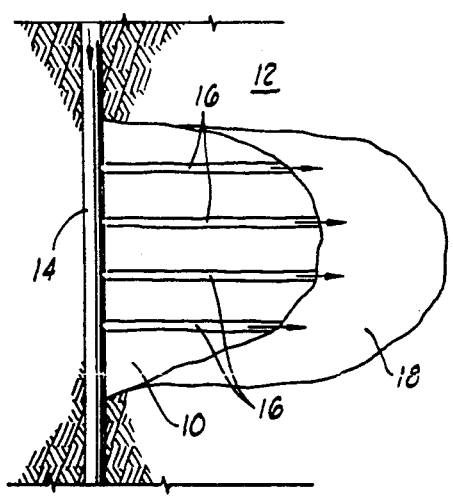
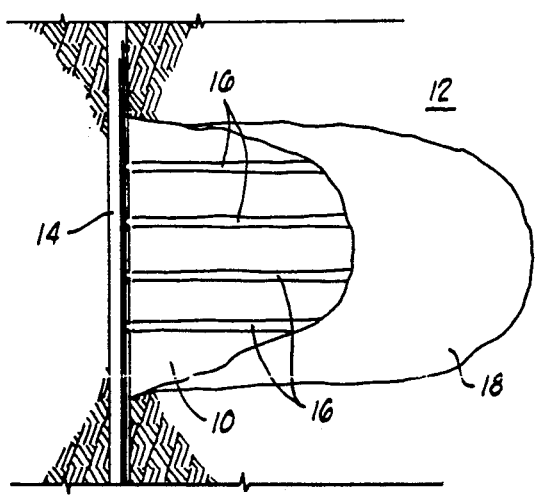

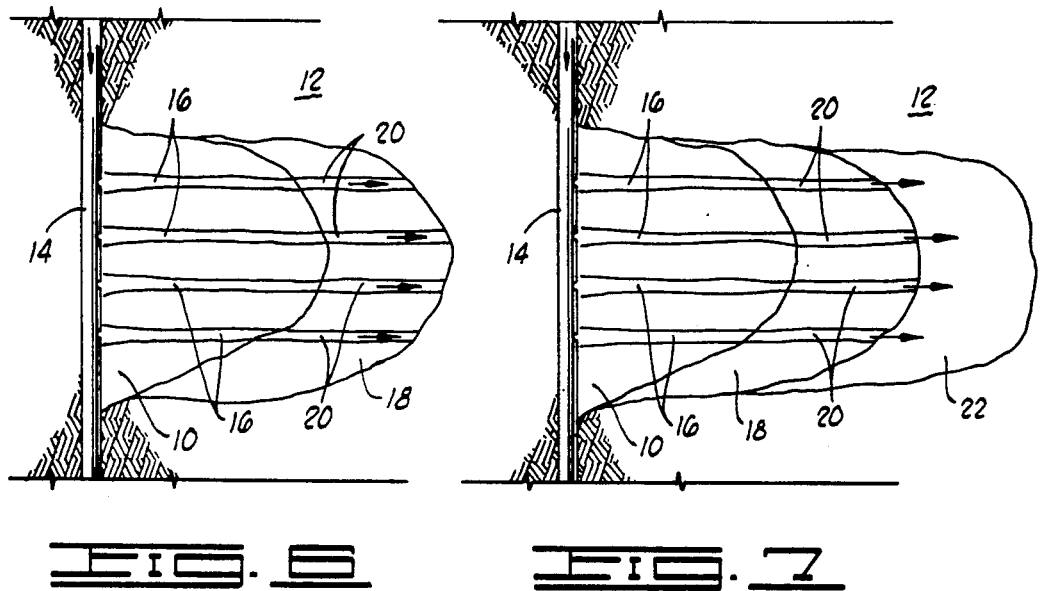
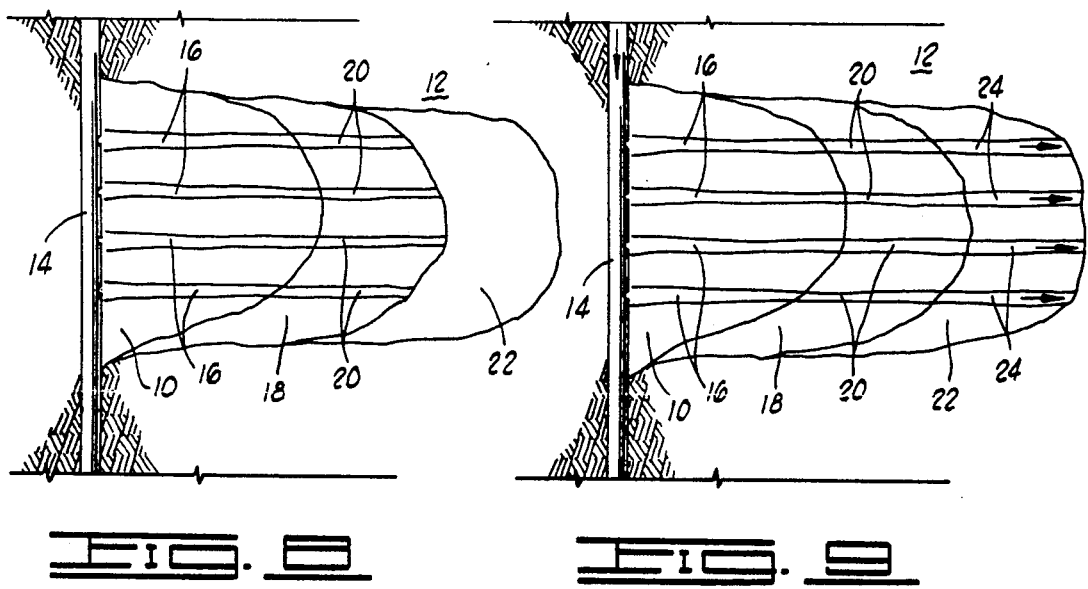

METHODS OF FRACTURE ACIDIZING SUBTERRANEAN FORMATIONS

BACKGROUND OF THE INVENTION

1. Field of the Invention

This invention relates to methods of fracture acidizing producing zones in subterranean formations.

2. Description of the Prior Art.

A variety of methods have been developed and used successfully for stimulating the production of oil and gas from subterranean formations. One commonly used stimulation method is known as fracture acidizing. Fracture acidizing is generally utilized for stimulating producing zones in subterranean formations formed of fracturable and acid soluble calcareous rock having relatively low permeability. Because of the low permeability, hydrocarbons contained in the zone normally flow into the well bore penetrating the zone at a low rate.

A fracture acidizing procedure generally comprises hydraulically fracturing the formation rock in a subterranean producing zone at above fracturing pressure using an acid which dissolves the fracture faces in such an uneven manner that when the fracture is closed and the zone is produced, flow channels are provided through which hydrocarbons contained in the zone more readily flow to the well bore. A problem often encountered in such fracture acidizing procedures involves over-etching or softening the entirety of the fracture faces. That is, the acid readily dissolves portions of the rock faces of the fractures, but when the pressure on the formation is reduced and the fractures are caused to close, the dissolved portions are often restricted as a result of the fracture faces being over-etched or softened and crushed against each other. Thus, reduced hydrocarbon flow capacity can result due to the entirety of the rock faces being exposed to the acid and becoming softened.

More recently, an improved method of fracture acidizing a subterranean producing zone has been developed and used which is described in U.S. Pat. No. 3,768,564 issued on Oct. 30, 1973 to Fredrickson and Knox. In accordance with that method, one or more fractures are created in a subterranean producing zone, the fractures are allowed to close prior to prolonged contact with acid and then additional acid is flowed between the closed faces of the fractures whereby high capacity flow channels are produced. The faces of the fractures are prevented from being over-etched and softened by the acid whereby portions of the fracture faces are left intact for providing support when the fractures are closed. More specifically, after fractures are created and extended in a subterranean producing zone, the faces of the fractures are contacted with acid while maintaining the fractures in an open position. Prior to over-etching the fracture faces, the fractures are allowed to close and acid is flowed through flow channels formed therein while the fractures are closed to enlarge the channels and increase their flow capacity.

While the method described in U.S. Pat. No. 3,768,564 has been utilized successfully over the years, it has been difficult to produce fractures containing flow channels which extend relatively long distances from the well bore into the subterranean producing zone. This is because fractures may tend to grow upwardly, downwardly, and outwardly directions adjacent to the well bore where the hydraulic pressure exerted on the formation is the greatest rather than in outwardly directions only away from the well bore as is desirable.

Thus, there is a need for an improved method of fracture acidizing a producing zone in a subterranean formation whereby fractures containing flow channels can be produced in the zone which extend greater distances outwardly from the well bore.

SUMMARY OF THE INVENTION

By the present invention, improved methods of fracture acidizing producing zones in subterranean formations are provided which overcome the shortcomings of the prior art and meet the need described above. The improved methods of the invention basically comprise the steps of creating one or more fractures in a subterranean zone, causing the fractures to close and injecting acid into and through the closed fractures so that flow channels are formed therein. The fractures are then extended in the zone, the extended fractures are caused to close and acid is injected through the previously formed flow channels and through the extended portions of the fractures so that flow channels are formed in the extended portions. The steps of extending the fractures, causing the fractures to close and forming flow channels in the extended portions are repeated until fractures having flow channels formed therein extend desired distances outwardly from the well bore.

It is, therefore, a general object of the present invention to provide improved methods of fracture acidizing subterranean formations.

A further object of the present invention is the provision of an improved method of fracture acidizing a producing zone in a subterranean formation whereby fractures having flow channels formed therein extend long distances outwardly from the well bore.

Other and further objects, features and advantages of the present invention will be readily apparent to those skilled in the art from a reading of the description of preferred embodiments which follows, when taken in conjunction with the accompanying drawings.

BRIEF DESCRIPTION OF THE DRAWINGS

FIG. 1 is a schematic illustration of a well bore in a subterranean producing zone just after a fracture has been created in the zone.

FIG. 2 is a schematic illustration of the well bore and producing zone of FIG. 1 after the fracture has been caused to close.

FIG. 3 is a schematic illustration of the well bore and producing zone of FIG. 2 after an acid has been injected through the closed fracture and flow channels have been formed therein in a generally horizontal manner.

FIG. 4 is a schematic illustration of the well bore and producing zone of FIG. 3 after the originally formed fracture has been extended.

FIG. 5 is a schematic illustration of the well bore and producing zone of FIG. 4 after the extended fracture has been caused to close.

FIG. 6 is a schematic illustration of the well bore and producing zone of FIG. 5 after additional acid has been injected through the extended fracture.

FIG. 7 is a schematic illustration of the well bore and producing zone of FIG. 6 after the fracture in the zone has again been extended.

FIG. 8 is a schematic illustration of the well bore and producing zone of FIG. 7 after the fracture has been caused to close.

FIG. 9 is a schematic illustration of the well bore and producing zone of FIG. 8 after additional acid has been injected through the fracture.

DESCRIPTION OF PREFERRED EMBODIMENTS

The improved methods of the present invention for fracture acidizing a producing zone in a subterranean formation result in the creation of high capacity flow channels in the producing zone extending long distances outwardly from the well bore. This in turn results in increased hydrocarbon production from the producing zone as compared to the heretofore used prior art methods.

The improved methods of this invention are basically comprised of the steps of creating one or more fractures with an acid or non-acid fluid in a subterranean producing zone, causing the fractures to close and then injecting acid into and through the closed fractures so that flow channels are formed therein. Since the flow channels formed by the acid tend to follow existing paths of least resistance, or more specifically, to follow areas of higher acid solubility or higher permeability which are normally parallel to the substantially horizontal formation layering effect, the flow channels generally extend outwardly from the well bore rather than upwardly or downwardly. The fractures are then extended in the zone, and since the already etched and highly conducted flow channels in the formation have very low friction, the well bore fracturing pressure is only slightly higher than the pressure at the ends of the flow channels. This in turn allows the newly created fractures to grow from the tips of the flow channels instead of only enlarging the fractures close to the well bore. The extended fractures are caused to close and additional acid is injected through the previously formed flow channels and through the extended portions of the fractures so that flow channels are formed in the extended portions which are communicated with the previously formed flow channels. The steps of extending the fractures, closing the fractures and injecting additional acid by way of the previously formed flow channels through the extended portions of the fractures are repeated until the fractures having flow channels formed therein have been extended desired distances in the zone.

Referring to the drawings, and particularly to FIG. 1, at least one fracture 10 in a subterranean producing zone 12 is created by pumping a fracturing fluid through a well bore 14 into the producing zone 12 at a rate whereby the pressure exerted on the material making up the zone 12 is higher than the fracturing pressure of the material. The term "fracturing pressure" is used herein to mean that pressure at which fractures are induced in a formation, and with continued pumping the fractures are maintained in the open position and extended.

After the fracture 10 is created in the producing zone 12, the fracture 10 is caused to close (FIG. 2) by reducing the pumping rate of the fracturing fluid whereby the pressure exerted in the zone 12 is below the fracturing pressure. In a preferred technique, the pumping of fluid into the production zone 12 is completely stopped until the pressure dissipates and the fracture 10 is caused to fully close. As will be understood by those skilled in the art, the fluid pumped through the well bore and into the producing zone being stimulated can be all acid containing fluid or it can be comprised of alternating quantities of non-acid fracturing fluid and acid containing fluid, with the pumping rate being reduced or stopped between the quantities of non-acid fracturing fluid and acid containing fluid.

After the fracture 10 has closed, the pumping of the fluid containing acid is at a rate whereby the pressure exerted on the zone 12 is below the fracturing pressure and the fracture 10 remains closed as the acidizing fluid is pumped therethrough and flow channels 16 are etched therein (FIG. 3).

Following the etching of the flow channels 16 in the fracture 10, the fracture 10 is extended by injecting additional fracturing fluid therein. That is, fracturing fluid is injected through the flow channels 16 in the fracture 10 at a rate whereby the pressure exerted in the zone 12 is again above the fracturing pressure. As a result, the fracture 10 is extended an additional distance outwardly from the well bore forming an extended portion 18 as shown in FIG. 4.

The fracture 10 including the extended portion 18 is caused to close by reducing or stopping the flow of fluid therethrough (FIG. 5), and fluid containing acid is then injected through the previously formed flow channels 10 and through the extended portion 18 of the fracture 10 at a rate whereby the pressure exerted in the zone 12 is below the fracturing pressure. As the acid flows through the flow channels 16 and the extended portion 18, the flow channels are widened and additional flow channels 20 are etched in the extended portion 18 as shown in FIG. 6.

The fracture 10 is extended by injecting additional fracturing fluid thereinto at a rate which produces a pressure above the fracturing pressure of the zone 12. The fracturing fluid flows through the flow channels 16 and 20 and the fracture 10 is again extended outwardly from the well bore 14 forming an extended portion 22 as shown in FIG. 7.

After causing the fracture 10 to close by reducing or stopping the flow of fluid therethrough (FIG. 8), additional fluid containing acid is injected into the fracture 10. That is, the acid fluid is injected at a rate whereby a pressure less than the fracturing pressure is exerted in the fracture 10 and flows by way of the previously formed flow channels 16 and 20 into and through the extended portion 22. A the acid flows through the extended portion 22 flow channels 24 are formed therein.

As described above, after a fracture is originally created in a producing zone and flow channels are etched therein, the fracture is extended by pumping additional fracturing fluid through the previously formed flow channels into the formation. Because the previously formed flow channels provide low friction conduits through which the fracturing fluid flows, the extension of the fracture at the ends of the existing enlarged flow channels tends to be in al directions, i.e., upward, downward and outward. However, on reducing the pressure and pumping acid through the closed fracture, the flow channels produced tend to follow the generally horizontal layers of highly acid soluble and/or highly permeable portions of the rock faces of the fracture. Thus, the flow channels are directed generally perpendicular to the well bore in the extended portion of the fracture. The acid injected into the fracture while it is closed may be retarded, unretarded or accelerated depending upon the particular type of rock making up the subterranean formation and other factors. In a preferred technique, unretarded acid is utilized in the originally created fracture with progressively more retarded acid being used to etch flow channels in the extended portion of the fracture.

A variety of conventionally used fracturing fluids may be employed in accordance with the present invention for initially creating one or more fractures in the formation and extending successive portions of the fractures. Examples of suitable such fracturing fluids are aqueous solutions, gelled aqueous solutions, aqueous acid solutions, gelled aqueous acid solutions, aqueous emulsions and aqueous acid containing emulsions.

Gelled aqueous acid solutions are generally but not always preferred for use as fracturing fluids in accordance with this invention. As is well understood by those skilled in the art, gelled aqueous solutions can be prepared by dissolving one or more hydratable polymers in water. The hydration of the polymer causes the viscosity of the resulting solution to be increased. Cross-linking agents can be added to further increase the viscosity of the gel. Other aqueous acid or non-acid solution viscosity increasing techniques can be utilized which are well known to those skilled in the art.

A variety of organic or inorganic acids dispersed or dissolved in aqueous or hydrocarbon carrier liquids can be utilized in accordance with the present invention. Generally, aqueous acid solutions are preferred. Preferred acids for treating calcareous formations are hydrochloric acid, acetic acid, formic acid, and mixtures of such acids. As mentioned, the acids utilized may be retarded for slowing the reaction rates of the acids with formation materials using heretofore known acid retarding agents. The reaction may also be accelerated by heating the acid mixture prior to pumping. The acids may contain conventional corrosion inhibitors to protect metal surfaces contacted thereby and surfactants to prevent emulsion problems. A generally preferred fluid containing acid for use in accordance with the present invention is a 10 to 30% by weight aqueous hydrochloric acid solution.

A preferred method of the present invention for fracture acidizing a producing zone in a calcareous formation is comprised of the following steps:
(a) pumping a fracturing fluid into the zone by way of the well bore at a rate whereby the pressure exerted on the zone is above the fracturing pressure thereof and one or more fractures are created therein;
(b) causing the fractures to close;
(c) pumping a fluid containing acid into and through the closed fractures at a rate whereby the pressure exerted on the zone is below the fracturing pressure thereof so that flow channels are formed in the closed fractures;
(d) pumping additional fracturing fluid into the zone and into the fractures at a rate whereby the pressure exerted on the formation is above the fracturing pressure and the fractures are extended;
(e) causing the fractures to close;
(f) pumping additional fluid containing acid through the previously formed flow channels and through the portions of the fractures extended in accordance with step (d) above at a rate whereby the pressure exerted on the zone is below the fracturing pressure so that flow channels are formed in the closed extended portions of the fractures; and
(g) repeating steps (d), (e) and (f) until the fractures having flow channels formed therein extend desired distances in the zone.

As mentioned above, the fractures can be caused to close in accordance with steps (b) and (e) by reducing the rate of pumping of the fracturing fluid whereby the pressure exerted on the zone is below the fracturing pressure. A preferred technique is to stop the pumping of fluid for a period of time to insure that the fractures have closed whereupon the fluid containing acid is pumped through the closed fracture at a rate which produces a pressure below the fracturing pressure.

In carrying out the above described method, the fracturing fluid is preferably a gelled aqueous fluid and the fluid containing acid is preferably an aqueous acid solution. The fluid pumped in performing the method is preferably comprised of alternating quantities of fracturing fluid and fluid containing acid. The quantities are predetermined and are coordinated with pumping rates and times between pumping stops whereby the fracturing and acidizing steps are carried out as described above.

In order to further illustrate the methods of the invention, the following example is given. The example is intended to illustrate a typical procedure utilizing the methods of the present invention. As will be understood, prior to carrying out the methods on a particular formation, conventional laboratory tests and calculations are made to determine the optimum fracturing fluid and acid properties, quantities, rates of injection, etc. The quantities and types of fluids given in the examples are for illustration purposes only and the present invention is not to be limited thereto.

EXAMPLE I

A producing zone in a subterranean formation is stimulated in accordance with the present invention to increase the production of oil and gas therefrom. The producing zone is a 50 foot interval, the top of which is at a depth of 5000 feet.

5000 gallons of a fracturing fluid comprised of a gelled 15% by weight aqueous hydrochloric acid solution are pumped into the producing zone at a rate of approximately 5 to 10 barrels per minute or at a pressure in the producing zone sufficient to fracture the zone, i.e., a pressure in the range of from about 3500 psig to about 4500 psig.

After one or more fractures are initially formed, the pumping is stopped for a sufficient time or the rate is reduced to allow the fractures to close, and 5000 gallons of a 15% by weight aqueous HCl acid solution are pumped into and through the closed fractures at a rate of about 2 to 3 barrels per minute or at a producing zone pressure which is below the fracturing pressure, i.e., a pressure in the range of from about 1000 psig to about 2000 psig. As the acid flows through the closed fractures, larger flow channels are etched in the fracture faces. Additional fracturing fluid is pumped at a rate of about 7 to 12 barrels per minute or a producing zone pressure in the range of from about 3500 psig to about 4500 psig to extend the fractures. The pumping is again stopped for a time period sufficient to cause the fractures to close, followed by the pumping of about 7500 gallons of 15% by weight aqueous hydrochloric acid solution at a rate of about 3 to 4 barrels per minute or a producing zone pressure in the range of from about 1000 psig to about 2000 psig to form larger flow channels in the extended portions of the fractures. The steps of pumping additional fracturing fluid, stopping the pumping to allow the fractures to close and pumping additional acid solution to form flow channels in the extended portions of the fractures are repeated so that fractures having flow channels formed therein are extended appreciable distances from the well bore into the producing zone, i.e., distances in the range of from about 500 feet to about 1000 feet.

The well is returned to production.

Thus, the present invention is well adapted to carry out the objects and attain the ends and advantages mentioned as well as those which are inherent therein. While numerous changes may be made to the invention by those skilled in the art such changes are encompassed within the spirit of the invention as defined by the appended claims.

What is claimed is:

1. An improved method of fracture acidizing a producing zone in a subterranean formation comprising the steps of:
   (a) creating one or more fractures in said zone;
   (b) causing said fractures to close;
   (c) injecting acid into and through said closed fractures so that flow channels are formed therein;
   (d) extending said one or more fractures in said zone;
   (e) causing said fractures to close;
   (f) injecting acid through said flow channels previously formed and through the portions of said fractures extended in accordance with step (d) while said fractures are closed so that flow channels are formed in said extended portions of said fractures; and
   (g) repeating steps (d), (e) and (f) until said fractures having flow channels formed therein extend desired distances in said zone.

2. The method of claim 1 wherein said fractures are created and extended in accordance with steps (a) and (d) by injecting a fracturing fluid into said zone at a rate whereby the pressure exerted on said zone is above the fracturing pressure thereof.

3. The method of claim 2 wherein said fractures are caused to close in accordance with steps (b) and (e) by reducing said rate of pumping of said fracturing fluid whereby the pressure exerted on said zone is below said fracturing pressure.

4. The method of claim 2 wherein said fractures are caused to close in accordance with steps (b) and (e) by stopping the pumping of said fracturing fluid.

5. The method of claim 1 wherein said acid is injected into and through said closed fractures in accordance with steps (c) and (f) by pumping a fluid containing acid into and through said fractures at a rate whereby the pressure exerted on said zone is below the fracturing pressure thereof.

6. The method of claim 1 wherein said acid is selected from the group consisting of hydrochloric acid, acetic acid, formic acid and mixtures thereof.

7. The method of claim 1 wherein said fracturing fluid is selected from the group consisting of aqueous solutions, gelled aqueous solutions, aqueous acid solutions, gelled aqueous acid solutions, aqueous emulsions and aqueous acid containing emulsions.

8. The method of claim 2 wherein said fracturing fluid comprises a gelled aqueous acid solution.

9. The method of claim 5 wherein said fluid containing acid comprises an aqueous acid solution.

10. The method of claim 8 or claim 9 wherein said acid is selected from the group consisting of hydrochloric acid, acetic acid, formic acid and mixtures thereof.

11. The method of claim 9 wherein said aqueous acid solution comprises a 10 to 30% by weight aqueous hydrochloric acid solution.

12. The method of claim 1 wherein said acid of step (c) comprises an unretarded or accelerated acid and said acid of step (f) comprises a retarded acid.

13. An improved method of fracture acidizing a producing zone in a subterranean formation penetrated by a well bore comprising the steps of:
   (a) pumping a fracturing fluid into said zone by way of said well bore at a rate whereby the pressure exerted on said zone is above the fracturing pressure thereof and one or more fractures are created therein;
   (b) causing said fractures to close;
   (c) pumping a fluid containing acid into and through said closed fractures so that flow channels are formed therein;
   (d) pumping additional fracturing fluid into said zone and into said fractures at a rate whereby the pressure exerted on said formation is above said fracturing pressure and said fractures are extended;
   (e) causing said fractures to close;
   (f) pumping additional fluid containing acid through said previously formed flow channels and through the portions of said fractures extended in accordance with step (d) while said fractures are closed so that flow channels are formed in said extended portions of said fractures; and
   (g) repeating steps (d), (e) and (f) until said fractures having flow channels formed therein extend desired distances in said zone.

14. The method of claim 13 wherein said fractures are caused to close in accordance with steps (b) and (e) by reducing the rate of pumping said fracturing fluid whereby the pressure exerted on said zone is below said fracturing pressure.

15. The method of claim 13 wherein said fractures are caused to close in accordance with steps (b) and (e) by stopping the pumping of said fracturing fluid.

16. The method of claim 13 wherein said fracturing fluid pumped in accordance with steps (a) and (d) comprises a gelled aqueous acid solution.

17. The method of claim 13 wherein said fluid containing acid pumped in accordance with steps (c) and (f) comprises an aqueous acid solution.

18. The method of claim 17 wherein said acid is selected from the group consisting of hydrochloric acid, acetic acid, formic acid and mixtures thereof.

19. The method of claim 17 wherein said aqueous acid solution comprises a 10 to 30% by weight aqueous hydrochloric acid solution.

20. The method of claim 13 wherein said acid of step (c) comprises an unretarded acid and said acid of step (f) comprises a retarded acid, or step (c) is an accelerated acid and step (f) is a non-retarded acid.

* * * * *